(12) United States Patent
Fujimaki

(10) Patent No.: US 11,494,149 B2
(45) Date of Patent: Nov. 8, 2022

(54) DISPLAY SYSTEM, INFORMATION PROCESSING DEVICE, DISPLAY CONTROL METHOD OF DISPLAY SYSTEM

(71) Applicant: SEIKO EPSON CORPORATION, Tokyo (JP)

(72) Inventor: Yutaka Fujimaki, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/216,723

(22) Filed: Mar. 30, 2021

(65) Prior Publication Data

US 2021/0303251 A1 Sep. 30, 2021

(30) Foreign Application Priority Data

Mar. 30, 2020 (JP) .............................. JP2020-060698

(51) Int. Cl.
| | |
|---|---|
| *G06F 3/14* | (2006.01) |
| *G06F 3/01* | (2006.01) |
| *G09G 5/38* | (2006.01) |
| *H04N 9/31* | (2006.01) |
| *G02B 27/01* | (2006.01) |

(52) U.S. Cl.
CPC ......... *G06F 3/1423* (2013.01); *G02B 27/017* (2013.01); *G02B 27/0172* (2013.01); *G02B 27/0179* (2013.01); *G06F 3/012* (2013.01); *G09G 5/38* (2013.01); *H04N 9/3105* (2013.01); *G02B 2027/014* (2013.01);
(Continued)

(58) Field of Classification Search
CPC ........ G06F 3/1423; G06F 3/012; G06F 3/011; G06F 3/147; G06F 3/1407; G02B 27/017; G02B 27/0172; G02B 27/0179; G02B 27/0093; G02B 2027/014; G02B 2027/0141; G02B 2027/0187; G02B 2027/0138; G09G 5/38; G09G 2354/00; G09G 2356/00; G09G 2340/0464; G09G 2340/10; G09G 2340/12; G09G 2340/14; G09G 3/003; H04N 9/3105; H04N 9/3179; H04N 9/3194; H04N 21/4122
See application file for complete search history.

(56) References Cited

U.S. PATENT DOCUMENTS

| | | | |
|---|---|---|---|
| 2016/0004335 A1* | 1/2016 | Hosenpud | G06F 3/04845 345/157 |
| 2017/0151034 A1* | 6/2017 | Oda | A61B 90/37 |
| 2017/0168767 A1* | 6/2017 | Guo | G06F 3/1462 |

FOREIGN PATENT DOCUMENTS

JP 2016031373 * 3/2016

* cited by examiner

*Primary Examiner* — Brent D Castiaux
(74) *Attorney, Agent, or Firm* — JCIPRNET

(57) ABSTRACT

A display system includes a projector, an HMD, and an information processing device. The information processing device includes a processing device storage unit configured to store three-dimensional map data in which setting information in which a display position of an object is set and positional information indicating a position of a display surface are registered, and image data of an object image, and a processing control unit configured to select whether to display the object image on the projector or to display the object image on the HMD, based on a positional relationship between a position of the HMD notified from the HMD and the display position of the object, and transmit the image data of the object image to the projector or the HMD being selected.

11 Claims, 9 Drawing Sheets

(52) U.S. Cl.
CPC .............. *G02B 2027/0141* (2013.01); *G02B 2027/0187* (2013.01); *G09G 2354/00* (2013.01); *G09G 2356/00* (2013.01)

DISPLAY SYSTEM, INFORMATION PROCESSING DEVICE, DISPLAY CONTROL METHOD OF DISPLAY SYSTEM

The present application is based on, and claims priority from JP Application Serial Number 2020-060698, filed Mar. 30, 2020, the disclosure of which is hereby incorporated by reference herein in its entirety.

BACKGROUND

1. Technical Field

The present disclosure relates to a display system, an information processing device, and a display control method of the display system.

2. Related Art

In the related art, a head-mounted display apparatus that displays an image through an external scene so as to be visually recognizable together with the external scene has been known. Since the head-mounted display apparatus allows the external scene to be visually recognizable while displaying the image, a mechanism for operating the head-mounted display apparatus with another display device has been proposed.

For example, a transmission-type display device disclosed in JP-A-2016-31373 acquires data about a display image displayed by an external display device, and captures the display image with a camera. The display device detects, from a captured image by the camera, that a part of the display image displayed by the external display device is blocked by an obstacle and becomes visually unrecognizable or less likely to be visually recognized. The display device displays the part of the display image and allows the display image to be visually recognizable.

The head-mounted display apparatus tends to increase a frame rate of an image in order to allow a user wearing the head-mounted display apparatus to visually recognize the image without an uncomfortable feeling, and a load on the head-mounted display apparatus tends to increase. Further, the head-mounted display apparatus superimposes an image on a real space for display. However, when a position in the real space on which the image is superimposed is too far from a user, the intended image may not be visually recognizable by the user. For example, in a case in which a stereoscopic image is displayed by the head-mounted display apparatus, when a position in the real space on which the stereoscopic image is superimposed is too far from the user, there is a problem that the user cannot visually recognize the stereoscopic image.

SUMMARY

An aspect that solves the problem described above is a display system including a display device configured to display an object image on a display surface, and a head-mounted display apparatus mounted on a head of a user and configured to display an object image so as to be visually recognizable together with an external scene, where the display system refers to map data in which a position in a real space associated with the object image and a position of the display surface in the real space are recorded, and acquires the position in the real space associated with the object image and the position of the display surface in the real space, and the display system displays the object image on any one of the display device and the head-mounted display apparatus, based on a position of the head-mounted display apparatus notified from the head-mounted display apparatus, the acquired position in the real space associated with the object image, and the acquired position of the display surface in the real space.

Another aspect that solves the problem described above is an information processing device communicably coupled to a display device configured to display an object image on a display surface, and a head-mounted display apparatus mounted on a head of a user and configured to display an object image so as to be visually recognizable together with an external scene, and the information processing device includes a first storage unit configured to store map data in which a position in a real space associated with the object image and a position of the display surface in the real space are recorded, and a control unit configured to display the object image on any one of the display device and the head-mounted display apparatus, based on a position of the head-mounted display apparatus notified from the head-mounted display apparatus, the position in the real space associated with the object image, and the position of the display surface in the real space.

Another aspect that solves the problem described above is a display control method of a display system including a display device configured to display an object image on a display surface, and a head-mounted display apparatus mounted on a head of a user and configured to display an object image so as to be visually recognizable together with an external scene, and the display control method of a display system includes receiving, from the head-mounted display apparatus, notification information that notifies a position of the head-mounted display apparatus, referring to map data in which a position in a real space associated with the object image and a position of the display surface in the real space are recorded, and acquiring the position in the real space associated with the object image and the position of the display surface in the real space, and displaying the object image on any one of the display device and the head-mounted display apparatus, based on the position of the head-mounted display apparatus, the acquired position in the real space associated with the object image, and the acquired position of the display surface in the real space.

DESCRIPTION OF EXEMPLARY EMBODIMENTS

Exemplary embodiments of the present disclosure are described below with reference to the accompanying drawings.

Figure 1:
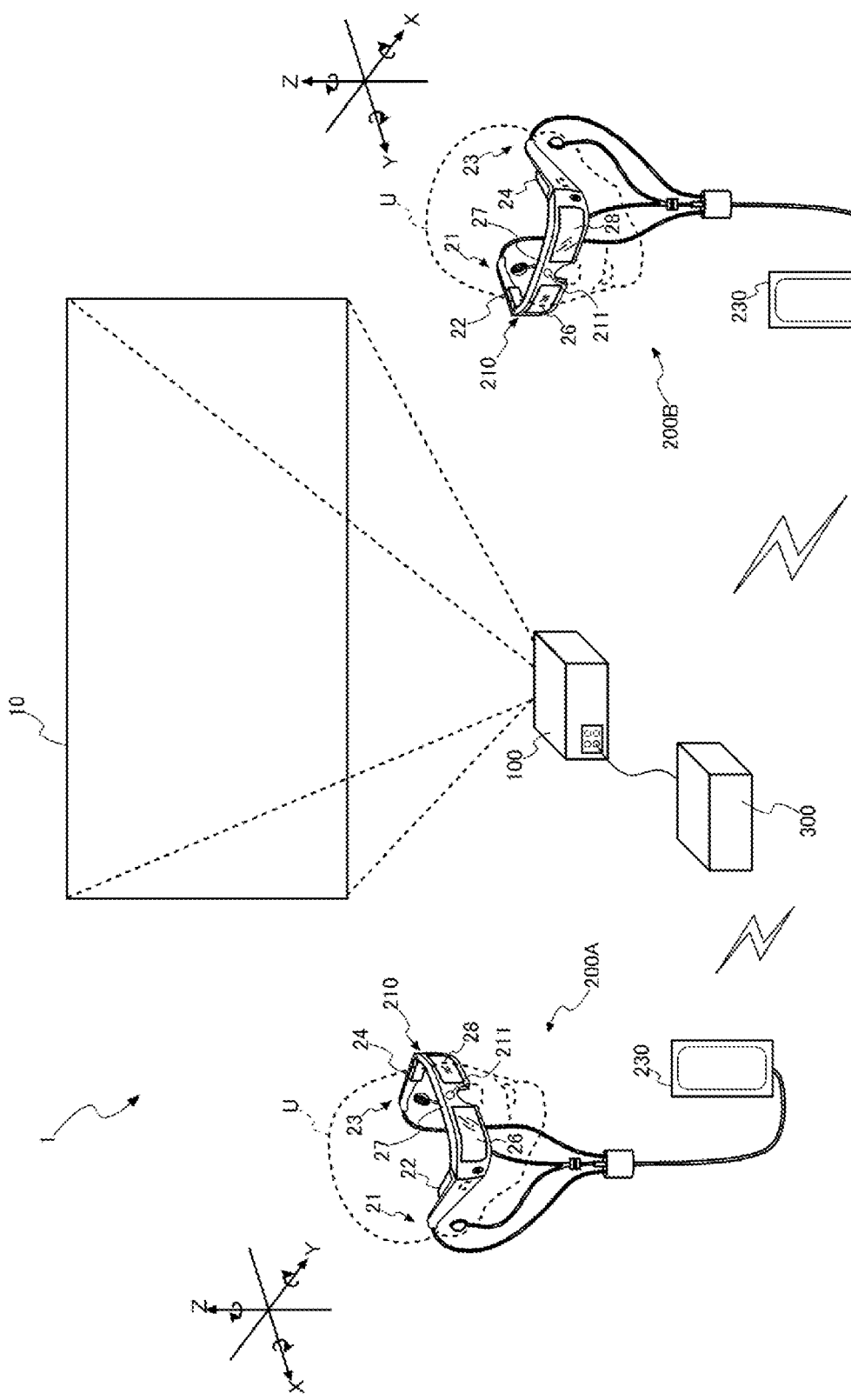
FIG. 1 is a diagram illustrating a schematic configuration of a display system.

FIG. 1 is a diagram illustrating a schematic configuration of a display system 1.

The display system 1 includes a projector 100, a head-mounted display apparatus 200, and an information processing device 300. The projector 100 corresponds to a display device of the present disclosure. The information processing device 300 is coupled to the projector 100 and the head-mounted display apparatus 200 so as to be able to perform data communication. FIG. 1 illustrates an example in which the information processing device 300 and the projector 100 are coupled to each other with a cable in a wired manner and the information processing devices 300 and the HMD 200 are coupled to each other in a wireless manner, but the information processing device 300 and the projector 100 may be coupled to each other in a wireless manner. Hereinafter, the head-mounted display apparatus 200 is referred to as the HMD 200. HMD is an abbreviation for Head Mounted Display.

FIG. 1 illustrates one projector 100 and one information processing device 300, and illustrates an HMD 200A and an HMD 200B in total of two as the HMD 200, but the number of the projector 100, the HMD 200, and the information processing device 300 is arbitrary. For example, the information processing device 300 may be configured to be coupled to a plurality of projectors 100 and a plurality of HMDs 200. Further, a plurality of information processing devices 300 coupled to the plurality of projectors 100 and the plurality of HMDs 200 may be provided. In the following description, the HMD 200A and the HMD 200B may be collectively referred to as the HMD 200. The HMD 200A corresponds to a first head-mounted display apparatus of the present disclosure, and the HMD 200B corresponds to a second head-mounted display apparatus of the present disclosure.

The projector 100 generates imaging light based on content data 363 supplied from the information processing device 300, and projects the generated imaging light onto a display surface 10. The display surface 10 may be a curtain-type screen, or an outer wall of a building, a wall surface of a room, a flat surface of an installed object, and the like may serve as the display surface 10. Further, the display surface 10 is not limited to a flat surface, and may be a curved surface and a surface having irregularities.

The HMD 200 includes an image display unit 210 mounted on a head of a user U, and a control device 230 that controls the image display unit 210. The HMD 200 causes an image based on the content data 363 received from the information processing device 300 to be displayed by the image display unit 210. The HMD 200 is a transparent type display device that causes the user U wearing the image display unit 210 on the head to visually recognize a virtual image, and also allows the user U to also visually recognize an external scene directly.

Further, the control device 230 may be a device specially provided for the HMD 200, and may be configured to couple an external device such as a smartphone via a connection device coupled to the image display unit 210. When the control device 230 is configured to couple the external device via the connection device, the connection device executes processing of operating various sensors included in the image display unit 210, and causing an image to be displayed on the image display unit 210, based on video data and display data input from the external device.

The information processing device 300 is a device that supplies the content data 363 to the projector 100 and the HMD 200. More specifically, the information processing device 300 selects whether to display an image based on the content data 363 on the HMD 200 or to to display the image on the projector 100, based on positional information of the HMD 200 notified from the HMD 200. The information processing device 300 transmits the content data 363 to the HMD 200 or the projector 100 being selected, and causes the image based on the content data 363 to be displayed.

The HMD 200 and the projector 100 display an object image 500 as an example of the image based on the content data 363. The object image 500 may be, for example, a stationary object such as a table, a desk, furniture, and a house, or a moving body such as an animal and a person.

The object image 500 displayed by the HMD 200 is displayed as a virtual object. The virtual object is not present in the real space, but is an image that is superimposed on the real space by being visually recognized by the user U through the image display unit 210, and makes the user U feel as if the virtual object is present in the real space. The projector 100 causes the object image 500 to be displayed on the display surface 10.

Figure 2:
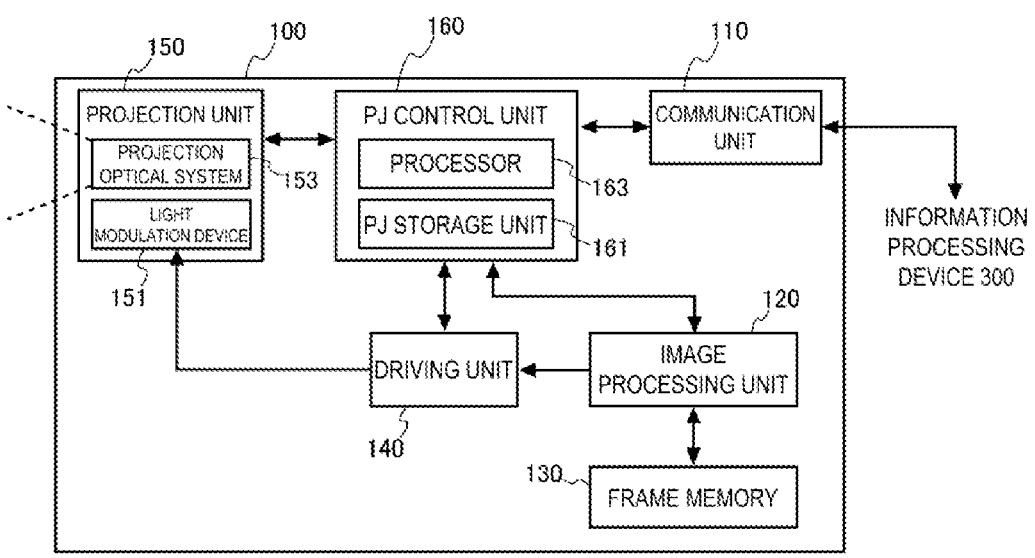
FIG. 2 is a block configuration diagram illustrating a configuration of a projector.

FIG. 2 is a block configuration diagram illustrating a configuration of the projector 100.

The configuration of the projector 100 will be described with reference to FIG. 2.

The projector 100 includes a communication unit 110, an image processing unit 120, a frame memory 130, a driving unit 140, a projection unit 150, and a PJ control unit 160.

The communication unit 110 includes a conductive connector and an interface circuit conforming to a prescribed communication standard, and transmits and receives data to and from the information processing device 300 coupled thereto via a cable. When the communication unit 110 receives the content data 363 from the information processing device 300, the communication unit 110 outputs the received content data 363 to the PJ control unit 160.

Image data is input to the image processing unit 120 from the PJ control unit 160. The image data is data included in the content data 363. The image processing unit 120 develops, in the frame memory 130, the image data input from the PJ control unit 160. The image processing unit 120 executes, on the image data developed in the frame memory 130, image processing such as, for example, resolution conversion processing or resizing processing, distortion aberration correction, shape correction processing, digital zoom processing, and an adjustment of a shade and brightness of an image. Of course, the image processing unit 120 can also execute the plurality of image processing described above in combination. When the image processing is completed, the image processing unit 120 generates a display signal corresponding to the image data developed in the frame memory 130, and outputs the generated display signal to the driving unit 140.

The driving unit 140 drives a light modulation device 151, based on the display signal input from the image processing unit 120. Further, the driving unit 140 turns on and turns off a light source and adjusts zooming and focus of a projection optical system according to control of the PJ control unit 160.

The projection unit 150 includes the light modulation device 151 and a projection optical system 153. The light modulation device 151 includes three liquid crystal panels provided for each color of red, green, and blue, for example.

The light modulation device 151 is driven by the driving unit 140, and light transmittance of the three liquid crystal panels is changed. Specifically, the light transmittance of the three liquid crystal panels is changed to light transmittance corresponding to a display signal. Light emitted by the light source passes through the light modulation device 151, and thus imaging light corresponding to the display signal is generated. The projection optical system 153 includes an optical element such as a lens and a mirror, and forms an image of the imaging light generated by the light modulation device 151 on the display surface 10.

The PJ control unit 160 includes a PJ storage unit 161 and a processor 163.

The PJ storage unit 161 includes a memory such as, for example, a ROM, a RAM, and a flash memory. ROM is an abbreviation for Read Only Memory. RAM is an abbreviation for Random Access Memory.

The PJ storage unit 161 stores a program executed by the processor 163 and various kinds of data processed by the processor 163 in a non-volatile manner.

The PJ control unit 160 controls each unit of the projector 100 by the processor 163 executing a program. The PJ control unit 160 controls each unit of the projector 100, and thus the projector 100 generates imaging light based on the content data 363 received from the information processing device 300, and causes the generated imaging light to be displayed on the display surface 10.

The projector 100 can cause a content such as video to be displayed on a three-dimensional projection target such as a building by so-called projection mapping. Further, the projector 100 can include a plurality of projectors 100 being arranged side by side, and also perform multiprojection that projects an image on the display surface 10 by the plurality of projectors 100.

Next, a configuration of the HMD 200 will be described with reference to FIG. 3.

Note that the HMD 200A and the HMD 200B have the same configuration, and thus a configuration of the HMD 200 will be described herein.

As illustrated in FIG. 1, the image display unit 210 is a member having a shape of glasses. The image display unit 210 includes a main body including a right holding part 21, a left holding part 23, and a front frame 27. The main body further includes a right display unit 22, a left display unit 24, a right light-guiding plate 26, and a left light-guiding plate 28. Further, the image display unit 210 is installed with, as a sensor, a camera 211, a geomagnetic sensor 213, and a six-axis sensor 215.

The right holding part 21 and the left holding part 23 extend rearward from corresponding ends of the front frame 27, to hold the image display unit 210 on the head of the user U.

The front frame 27 has a shape formed by coupling an end of the right light-guiding plate 26 and an end of the left light-guiding plate 28 to each other, and this coupling position corresponds to a position between eyebrows of the user U in a state where the user U wears the image display unit 210.

Each of the right display unit 22 and the left display unit 24 is a module obtained by unitizing an optical unit and a peripheral circuit. The right display unit 22 causes an image to be displayed by the right light-guiding plate 26, and the left display unit 24 causes an image to be displayed by the left light-guiding plate 28. The right display unit 22 is attached to the right holding part 21, and the left display unit 24 is attached to the left holding part 23.

The right display unit 22 includes, as a configuration that causes a right eye to visually recognize an image, a right OLED unit that emits imaging light, and a right optical system that guides the imaging light emitted from the right OLED unit to the right light-guiding plate 26. OLED is an abbreviation for Organic Light Emitting Diode. The right OLED unit and the right optical system are not illustrated.

The left display unit 24 includes, as a configuration that causes a left eye to visually recognize an image, a left OLED unit that emits imaging light, and a left optical system that guides the imaging light emitted from the left OLED unit to the left light-guiding plate 28. The left OLED unit and the left optical system are not illustrated.

The camera 211 is provided on the front frame 27 and located such that the camera 211 does not block the outside light passing through the right light-guiding plate 26 and the left light-guiding plate 28. The camera 211 is a digital camera including an imaging element such as a CCD and a CMOS, an imaging lens, and the like, and may be a monocular camera or a stereo camera. An angle of view of the camera 211 includes at least a part of a range of an external scene visually recognized by the user U wearing the image display unit 210 through the right light-guiding plate 26 and the left light-guiding plate 28.

The geomagnetic sensor 213 is a three-axis sensor that detects a magnetic field in an X-axis direction, a Y-axis direction, and a Z-axis direction. An X-axis, a Y-axis, and a Z-axis are respective three axis directions orthogonal to each other as illustrated in FIG. 1. The Z-axis direction corresponds to a vertical direction. The X-axis direction corresponds to a left-right direction of the head of the user U. The Y-axis direction corresponds to a front-back direction of the head of the user U.

The six-axis sensor 215 is a motion sensor including a three-axis acceleration sensor and a three-axis gyro sensor. The six-axis sensor 215 may adopt an IMU in which the sensors described above are provided as modules.

The six-axis sensor 215 and the geomagnetic sensor 213 perform sampling for each predetermined period such as, for example, 50 msec, and outputs an analog voltage value indicating a detection result. The output voltage value is converted into a digital signal by an A/D converter and is output to an HMD control unit 250.

Next, the control device 230 will be described.

The control device 230 includes an operation unit 231, a communication unit 233, a beacon reception unit 235, and the HMD control unit 250.

The operation unit 231 is a reception unit that includes a button, a switch, and the like, and receives an operation of the user U. The operation unit 231 outputs an operation signal corresponding to the received operation to the control device 230.

The communication unit 233 corresponds to a wireless communication protocol such as Bluetooth and Wi-Fi, and performs wireless communication with the information processing device 300. Note that Bluetooth and Wi-Fi are a registered trademark.

The beacon reception unit 235 receives a beacon signal. A plurality of beacon devices that transmit a beacon signal are installed in a field. The field is a region in which the projector 100, the information processing device 300, and the display surface 10 are installed, and the user U can move, and may be outdoor or indoor. The beacon reception unit 235 receives a beacon signal transmitted from the beacon devices.

The HMD control unit 250 includes an HMD storage unit 260 and a processor 270.

The HMD storage unit 260 includes a ROM and a RAM. Further, the HMD storage unit 260 may be configured to include a non-volatile memory such as a flash memory and the like in addition to the ROM and the RAM. The HMD storage unit 260 corresponds to a second storage unit of the present disclosure.

The HMD storage unit 260 stores a program executed by the processor 270 and various kinds of data processed by the processor 270 in a non-volatile manner. For example, the HMD storage unit 260 stores an operating system as a basic control program executed by the processor 270, an application program operating on the operating system, and the like. Further, the processor 270 stores data processed during execution of the application program and data about a processing result.

Further, the HMD storage unit 260 stores identification information 265 identifying the HMD 200. Furthermore, the HMD storage unit 260 stores positional information indicating an installation position of a beacon device that transmits a beacon signal in the field, and identification information identifying each beacon device.

The processor 270 is configured with a CPU, a microcomputer, a DSP, and the like, and is configured to execute a program to control each unit of the control device 230. The processor 270 may be a SoC that integrates the processor 270 and the HMD storage unit 260. DSP is an abbreviation for Digital Signal Processor. SoC is an abbreviation for System-on-a-chip.

The HMD control unit 250 achieves various functional configurations by the processor 270 executing a program stored in the HMD storage unit 260. The HMD control unit 250 includes, as functional configurations, a communication control unit 271, a position detection unit 273, a head orientation detection unit 275, a sound processing unit 277, a display control unit 279, and a detection control unit 281.

The communication control unit 271 controls the communication unit 233, and performs data communication with the information processing device 300.

The position detection unit 273 detects a moving amount and a moving direction of the HMD 200, based on sensor data of a three-axis acceleration sensor and a three-axis gyro sensor included in the six-axis sensor 215. The position detection unit 273 detects a position of the HMD 200 in the field, based on the moving amount and the moving direction being detected.

Further, the position detection unit 273 detects a position of the HMD 200 in the field, based on a beacon signal received by the beacon reception unit 235. The position detection unit 273 receives a beacon signal from at least three beacon devices, and estimates a distance between the beacon device serving as a transmission source of the beacon signal and the HMD 200, based on signal intensity of the received beacon signal. Then, the position detection unit 273 estimates a current position of the HMD 200 by three-point positioning or four-point positioning, based on the estimated distance between the at least three beacon devices and the HMD 200. In order for the position detection unit 273 to estimate a current position based on a beacon signal, the beacon signal needs to be received from at least three beacon devices while the HMD 200 is stationary. Thus, the beacon device needs to be disposed such that reaching ranges of beacon signals transmitted from a plurality of beacon devices partially overlap each other, and transmission power of the beacon device needs to be set. Further, when the plurality of beacon devices are disposed in close proximity, a transmission period is adjusted such that transmission timing of the beacon signal does not match. The reason is to prevent an increase in probability of failure in receiving some beacon signals and failure in acquiring information superimposed on a beacon signal when the HMD 200 simultaneously receives beacon signals transmitted from the plurality of beacon signals.

Further, the position detection unit 273 may be configured to correct a position of the HMD 200 detected based on the signal intensity of the beacon signal by the sensor data of the three-axis acceleration sensor and the three-axis gyro sensor included in the six-axis sensor 215.

The head orientation detection unit 275 detects a position and a movement of the head of the user U, based on sensor data of the six-axis sensor 215 and the geomagnetic sensor 21. Further, the head orientation detection unit 275 may detect a movement of the upper half of the body including the head of the user U.

The head orientation detection unit 275 detects an azimuth angle indicating a direction in which the head of the user U faces, based on the sensor data of the geomagnetic sensor 213. The azimuth angle corresponds to an orientation of the head of the present disclosure. Further, the head orientation detection unit 275 detects a pitch angle that is a rotation angle about the X-axis of the head, based on the sensor data of the gyro sensor included in the six-axis sensor 215. The detected pitch angle is a slope with respect to a horizontal plane that is a plane including the X-axis set in the left-right direction of the head and the Y-axis set in the front-rear direction of the head. The slope is an angle of elevation or an angle of depression. The angle of elevation or the angle of depression corresponds to an angle of the head with respect to the vertical direction of the present disclosure.

The HMD control unit 250 transmits, to the information processing device 300 for each predetermined time, notification information including positional information indicating a position of the HMD 200, azimuth angle information indicating an orientation of the head, elevation angle information or depression angle information, and identification information of the HMD 200.

When sound data is included in the content data 363 received from the information processing device 300, the sound processing unit 277 processes the sound included in the content and outputs the sound from an earphone 220.

The display control unit 279 executes various kinds of processing for causing an image to be displayed on the image display unit 210, based on video data included in the content data 363 received from the information processing device 300. The display control unit 279 executes various kinds of processing such as cutting out of a frame from video data, resolution conversion, scaling, intermediate frame generation, and frame rate conversion, and outputs the video data after execution of various kinds of processing to the left display unit 24 and the right display unit 22.

The detection control unit 281 analyzes a captured image of the camera 211, and detects an operation performed by the user U. The camera 211 and the detection control unit 281 correspond to a reception unit of the present disclosure.

When the operation unit 231 receives a preset operation in a state where the image display unit 210 displays the object image 500, the detection control unit 281 detects an image of a hand of the user from a captured image of the camera 211, and receives an operation that specifies a moving amount and a moving direction of the object image 500. The detection control unit 281 detects a moving direction that is a direction in which the hand of the user U moves and a moving amount in which the hand of the user U moves, based on the image of the hand detected from the captured image of the camera 211 being continuously captured. In addition, the user U may input, by operating the operation unit 231, a moving direction and a moving amount in which a position in the field associated with the object image 500 is moved.

When the detection control unit 281 detects a moving amount and a moving direction of the hand, the detection control unit 281 transmits information indicating the moving amount and the moving direction being detected to the information processing device 300. When the information processing device 300 receives the information indicating the moving amount and the moving direction from the HMD 200, the information processing device 300 rewrites a position of the field associated with the object image 500 being recorded in three-dimensional map data 361 described later.

Figure 4:
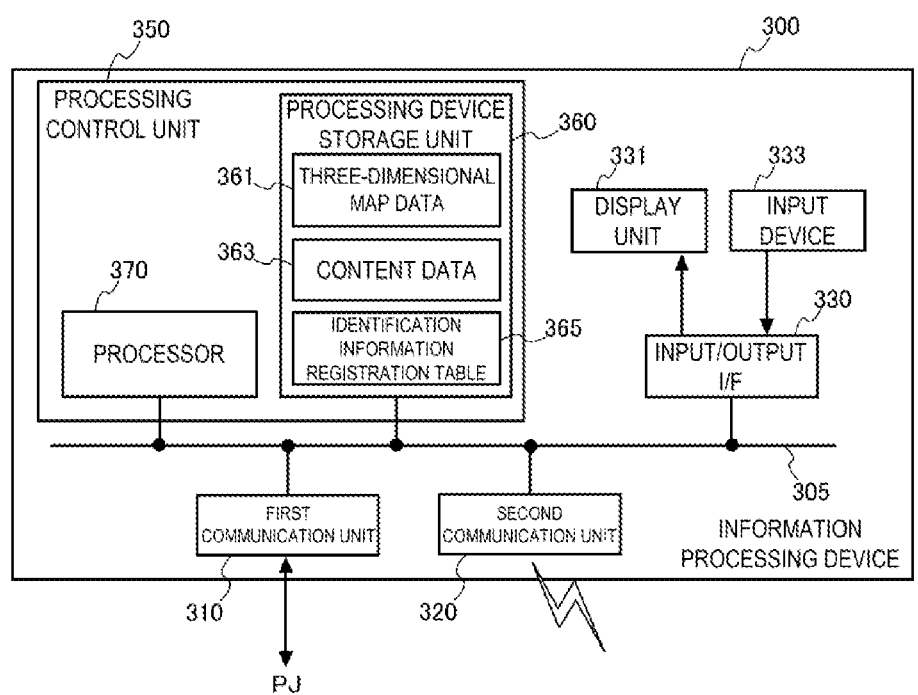
FIG. 4 is a block configuration diagram illustrating a configuration of an information processing device.

Next, a configuration of the information processing device 300 will be described with reference to FIG. 4. FIG. 4 is a block configuration diagram illustrating the configuration of the information processing device 300.

The information processing device 300 is a so-called computer device, and a notebook PC desktop PC is used. PC is an abbreviation for Personal Computer. The information processing device 300 includes a first communication unit 310, a second communication unit 320, an input/output I/F 330, a display unit 331, an input device 333, and a processing control unit 350. The first communication unit 310, the second communication unit 320, the input/output I/F 330, and the processing control unit 350 are coupled to each other via a bus 305. I/F is an abbreviation for Interface.

The first communication unit 310 includes a conductive connector and an interface circuit conforming to a prescribed communication standard, and transmits and receives data to and from the projector 100 coupled thereto via a cable.

The second communication unit 320 corresponds to a wireless communication protocol such as Bluetooth and Wi-Fi, and performs wireless communication with the HMD 200A and the HMD 200B.

The input/output I/F 330 is coupled to the display unit 331 and the input device 333, outputs data input via the bus 305 to the display unit 331, and outputs data input from the input device 333 to the processing control unit 350.

The display unit 331 includes, for example, a display panel such as a liquid crystal panel, and causes a display image generated by the processing control unit 350 to be displayed. The liquid crystal panel is not illustrated.

The input device 333 includes an input device such as a mouse and a keyboard, and receives an operation of a user. The input device 333 outputs an operation signal corresponding to the received operation to the processing control unit 350 via the input/output I/F 330. Note that the user is different from the user U wearing the image display unit 210 of the HMD 200 on the head.

The processing control unit 350 includes a processing device storage unit 360 and a processor 370. The processing device storage unit 360 includes a memory such as a ROM, a RAM, and a flash memory, and a storage device such as an HDD and an SSD. HDD is an abbreviation for Hard Disk Drive. SSD is an abbreviation for Solid State Drive. The processing device storage unit 360 corresponds to a first storage unit of the present disclosure.

The processing device storage unit 360 stores an operating system as a basic control program and an application program operating on the operating system. Further, the processing device storage unit 360 stores background image data that is data about a background image displayed on the display surface 10 by the projector 100.

Furthermore, the processing device storage unit 360 stores the three-dimensional map data 361, the content data 363, and an identification information registration table 365. The three-dimensional map data 361 corresponds to map data of the present disclosure.

In the three-dimensional map data 361, information indicating a position in the field associated with the object image 500 and the display surface 10 is registered. The field corresponds to the real space of the present disclosure. The information indicating a position in the field may be coordinate information of a three-dimensional Cartesian coordinate system set in the field, or may be a latitude or a longitude indicating a position in the field. In the present exemplary embodiment, a case in which the information indicating a position in the field is coordinate information of the three-dimensional Cartesian coordinate system will be described. In the following, coordinate axes of the three-dimensional Cartesian coordinate system are denoted as an x-axis, a y-axis, and a z-axis. The z-axis is an axis extending in the vertical direction of the field. The x-axis is an axis perpendicular to the z-axis. The y-axis is an axis perpendicular to the z-axis and the x-axis. Further, in the following, a position in the field associated with the object image 500 and the display surface 10 is referred to as a corresponding position.

The coordinate information indicating the corresponding position of the object image 500 being registered in the three-dimensional map data 361 can be changed by an operation of the input device 333. When the input device 333 receives the operation of changing the corresponding position of the object image 500, the processing control unit 350 rewrites the coordinate information indicating the corresponding position of the object image 500 being registered in the three-dimensional map data 361 according to the received operation.

The content data 363 is image data of the object image 500. The content data 363 may be image data of a still image or image data of a moving image. The content data 363 may also include sound data.

The content data 363 includes data for displaying the object image 500 by AR. AR is an abbreviation for Augmented Reality. An image of an AR displayed virtual object is an image visually recognized by being superimposed on an external scene visually recognized by the user U through the image display unit 210, i.e., a scene and an object in the real space. The visibility of the external scene when the image of the AR displayed virtual object is determined by a ratio between the amount of imaging light emitted from each of the right display unit 22 and the left display unit 24 and the amount of external light incident on the right eye and the left eye of the user U from the outside of the image display unit 210.

Further, the content data 363 includes data for three-dimensionally displaying the object image 500. The data for three-dimensionally displaying the object image 500 may be a moving image or a still image. The data for three-dimensionally displaying the object image 500 includes image data for the right eye displayed by the right display unit 22 and image data for the left eye displayed by the left display unit 24. The parallax between the image data for the right eye and the image data for the left eye may be preset. Further, the parallax may be adjustable by the HMD 200, and may be configured to be able to be specified by an operation of the user U.

The identification information registration table 365 is a table in which identification information of the HMD 200 and identification information of the content data 363 stored in the processing device storage unit 360 are registered in association with each other. The content data 363 stored in the processing device storage unit 360 includes a content permitted to be visually recognized or test-listened only by a preset specific user U. In the identification information registration table 365, identification information of a content permitted to be visually recognized or test-listened only by the specific user U and the identification information of the HMD 200 worn by the user U who is permitted to visually recognize or test-listen to the content are registered in association with each other.

The processor 370 is configured with a CPU, a microcomputer, a DSP, and the like, and is configured to execute a program to control each unit of the information processing device 300. The processor 370 may be a SoC that integrates the processor 370 and the processing device storage unit 360.

The processing control unit 350 achieves various functional configurations by the processor 370 executing an operating system and an application program stored in the processing device storage unit 360.

Next, an operation of the processing control unit 350 will be described.

The second communication unit 320 of the information processing device 300 receives the notification information transmitted from the HMD 200. The second communication unit 320 receives the notification information transmitted from the HMD 200 for each predetermined time. The notification information received by the second communication unit 320 is input to the processing control unit 350. The processing control unit 350 starts processing by receiving an input of the notification information.

Figure 5:
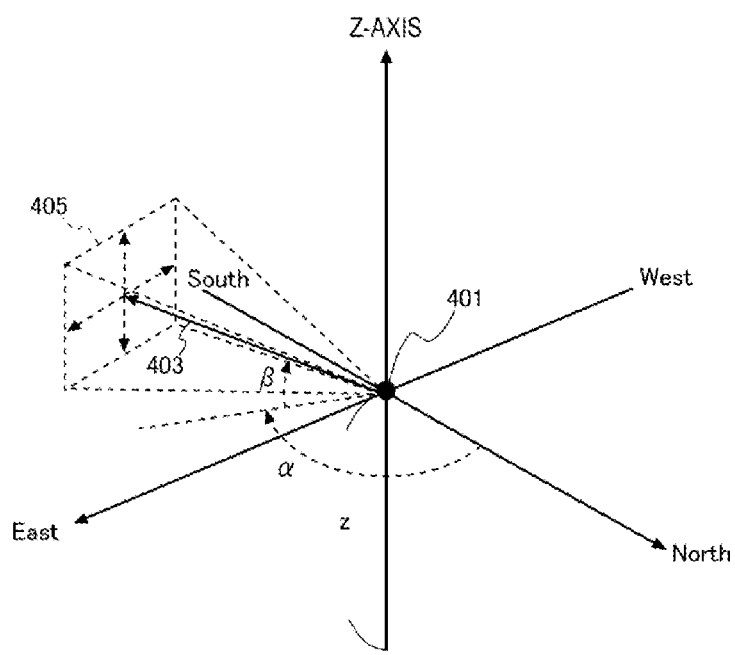
FIG. 5 is a diagram illustrating a visual field range of a user.

First, the processing control unit 350 acquires the positional information, the azimuth angle information, and the elevation angle information or the depression angle information of the HMD 200 included in the notification information. The processing control unit 350 estimates a visual field range being visually recognizable by the user U. The processing control unit 350 sets a visual field range 405 of the user U, based on the positional information, the azimuth angle information, and the elevation angle information or the depression angle information being acquired. A method of setting the visual field range 405 will be described with reference to FIG. 5. FIG. 5 is a diagram illustrating the visual field range 405 of the user U.

First, the processing control unit 350 sets coordinates indicated by the acquired positional information to a user position. The user position is a position of the user U wearing the HMD 200. Next, the processing control unit 350 sets a viewpoint position 401 that is a position of the eye of the user U wearing the HMD 200, based on the positional information. The position of the user U in the field uses the positional information included in the notification information, and a height is set to a predetermined height being preset. The height can be more accurate by setting different values for men and women. Further, information indicating a height of the user U or a height to the eye may be acquired in advance.

Next, the processing control unit 350 sets the visual field range 405 of the user U, based on the azimuth angle information and the elevation angle information or the depression angle information included in the notification information. The processing control unit 350 sets a line-of-sight direction 403, based on the azimuth angle information and the elevation angle information or the depression angle information with reference to the set viewpoint position 401. FIG. 5 illustrates the azimuth angle information with an azimuth angle as an angle α, and the line-of-sight direction 403 with an angle of elevation indicated by the elevation angle information as an angle β. Next, the processing control unit 350 sets, to the visual field range 405, a range at a predetermined distance from the line-of-sight direction 403 in the up-down and left-right directions with the line-of-sight direction 403 as the center. At this time, a distance in a horizontal direction between the viewpoint position 401 and the visual field range 405 is set to a preset distance. For example, the distance may be a distance from a position of the user U to an end portion of the field in the line-of-sight direction 403.

When the visual field range 405 is set, the processing control unit 350 detects the object image 500 having a position of the associated field included within the range acquired by connecting the viewpoint position 401 and four vertexes of the visual field range 405. The range acquired by connecting the viewpoint position 401 and the four vertexes of the visual field range 405 is referred to as a detection range.

For example, when the coordinate information indicating a position in the field associated with the object image 500 includes three-dimensional information of the x-axis, the y-axis, and the z-axis, the processing control unit 350 detects the object image 500 having a position associated with the detection range.

Further, when the coordinate information indicating a position in the field associated with the object image 500 includes two-dimensional information of the x-axis and the y-axis, the processing control unit 350 converts the detection range into a range in a xy plane constituted by the x-axis and the y-axis. The processing control unit 350 detects the object image 500 having a position associated within the range in the xy plane of the detection range.

When the processing control unit 350 detects the object image 500, the processing control unit 350 determines whether the identification information is set for the detected object image 500. When the identification information is not set for the detected object image 500, the processing control unit 350 reads the content data 363 corresponding to the detected object image 500 from the processing device storage unit 360. The processing control unit 350 transmits the read content data 363 to the HMD 200 that has received the notification information.

Further, when the detected object image 500 is the object image 500 for which the identification information is set, the processing control unit 350 refers to the identification information registration table 365. The processing control unit 350 refers to the identification information registration table 365, and determines whether the identification information of the object image 500 is associated with the identification information of the HMD 200 that has received the notification information.

When the identification information of the object image 500 is associated with the identification information of the HMD 200 that has received the notification information, the processing control unit 350 reads the content data 363 corresponding to the detected object image 500 from the processing device storage unit 360. The processing control unit 350 transmits the read content data 363 to the HMD 200.

Further, when the identification information of the object image 500 is not associated with the identification information of the HMD 200 that has received the notification information, the processing control unit 350 does not transmit the content data 363 to the HMD 200. In this way, only the user U who is permitted to test-listen to or visually recognize the content data 363 can test-listen to or visually recognize the content data 363.

Next, a case in which the object image 500 is included in the set visual field range 405, but a distance between a position of the user U and a corresponding position of the object image 500 is longer than a reference distance will be described.

The processing control unit 350 selects whether to display the object image 500 on the projector 100 or to display the object image 500 on the HMD 200, based on the positional relationship between a position of the HMD 200 and the corresponding position of the object image 500. In the present exemplary embodiment, with a distance between the HMD 200 and the display surface 10 as the reference distance, the processing control unit 350 causes the object image 500 having a distance to the HMD 200 shorter than the reference distance to be displayed on the HMD 200. Further, the processing control unit 350 causes the object image 500 having a distance to the HMD 200 longer than the reference distance to be displayed on the display surface 10 by the projector 100.

The processing control unit 350 calculates a distance from a user position indicated by the positional information to the display surface 10. For example, the processing control unit 350 may calculate a distance from the user position to the center of the display surface 10. Further, the processing control unit 350 may detect, as a distance to the display surface 10, a position of the display surface 10 closest to the user position or a position of the display surface 10 farthest from the user position. The distance calculated herein is referred to as the reference distance.

When the processing control unit 350 calculates the reference distance, the processing control unit 350 determines whether there is the object image 500 having a distance from the user position longer than the reference distance among the detected object images 500. The processing control unit 350 calculates a distance to the object image 500, based on coordinates of the user position and coordinates of the corresponding position of the object image 500, and compares the calculated distance with the reference distance.

When the processing control unit 350 detects the object image 500 having a distance from the user position longer than the reference distance, the processing control unit 350 determines that the object image 500 is an image to be displayed on the display surface 10.

When the processing control unit 350 detects the object image 500 having a corresponding position included in the visual field range 405 and having a distance from the user position longer than the reference position, the processing control unit 350 determines that the object image 500 is an image to be displayed on the display surface 10.

Figure 6:
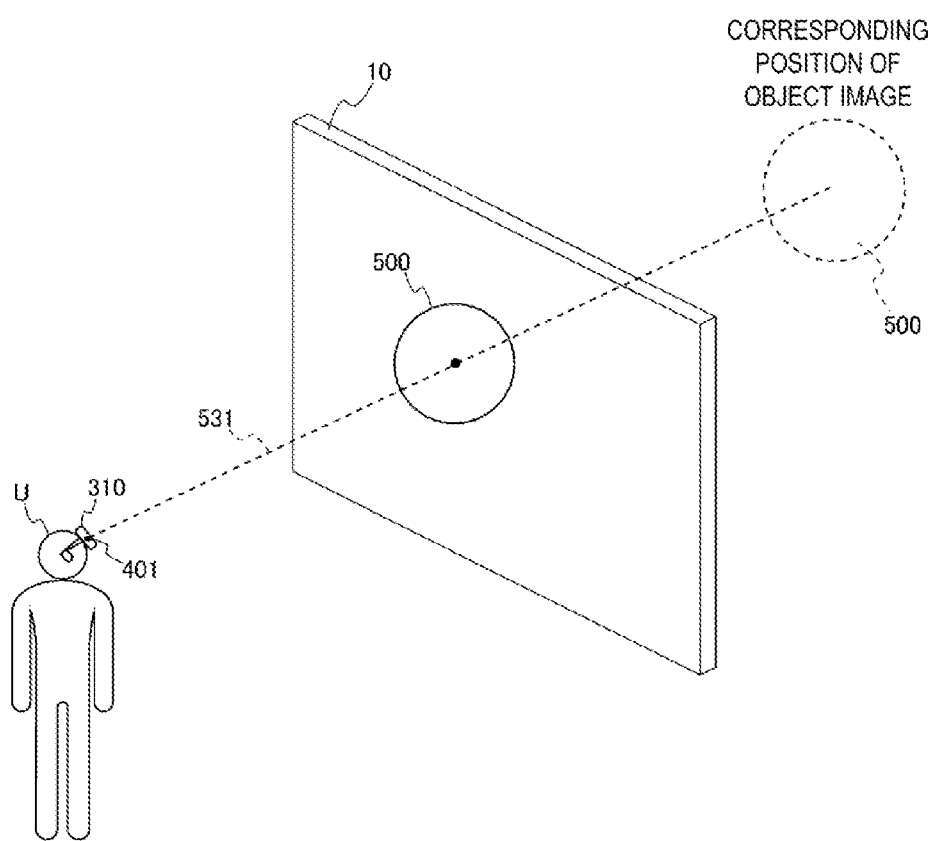
FIG. 6 is a diagram illustrating a display position of an object image on a display surface.
Figure 7:
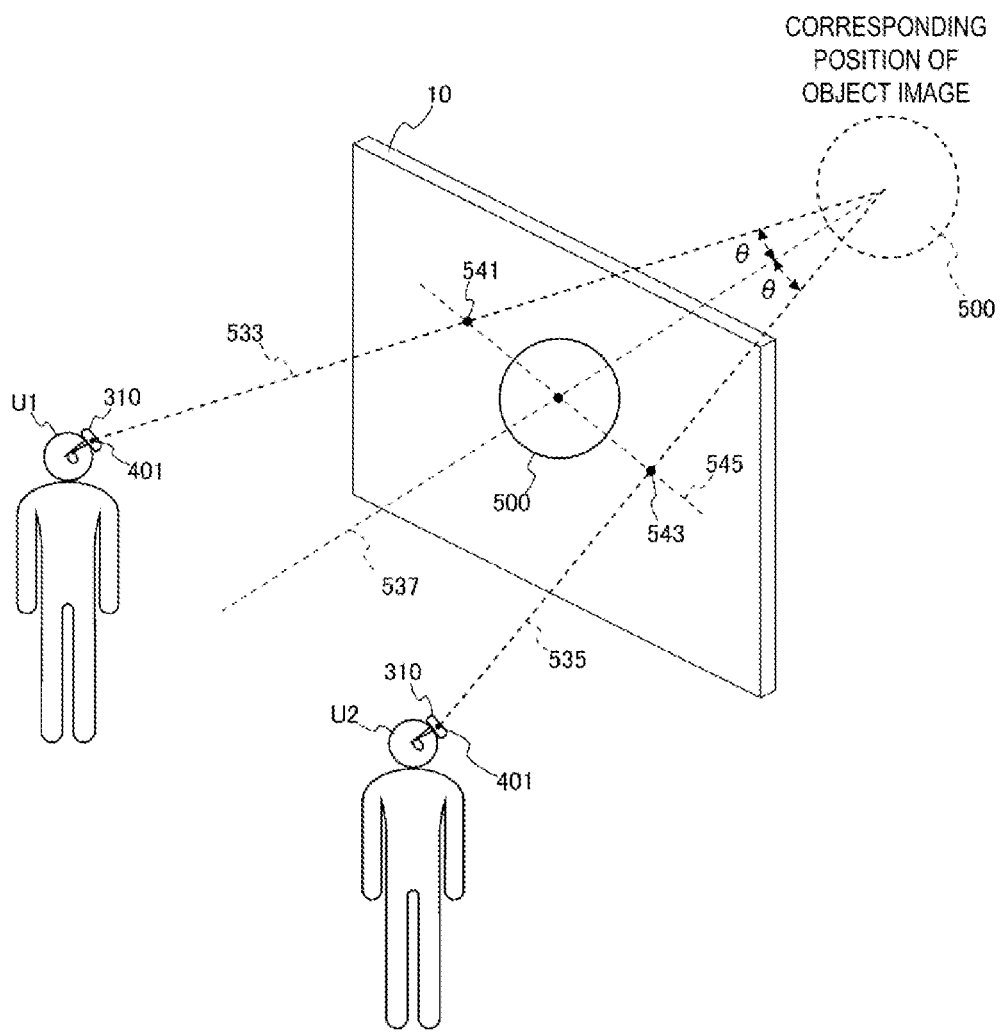
FIG. 7 is a diagram illustrating a display position of an object image on a display surface.

Next, the processing control unit 350 determines a position of the display surface 10 on which the object image 500 is displayed. The processing will be described with reference to FIGS. 6 and 7. FIGS. 6 and 7 are diagrams illustrating a corresponding position of the object image 500 on the display surface 10.

First, a case in which the number of users U in a position where the object image 500 is visually recognizable is one will be described with reference to FIG. 6.

As illustrated in FIG. 6, the processing control unit 350 sets a straight line 531 connecting the viewpoint position 401 of the user U and the center of the object image 500, and determines a display position on the display surface 10 such that the center of the object image 500 is located in a position where the set straight line 531 intersects the display surface 10.

Next, a case in which the number of users U in a position where the object image 500 is visually recognizable is plural will be described with reference to FIG. 7. Here, a case in which two users of a user U1 and a user U2 are present as the user U in the position where the object image 500 is visually recognizable will be described. The user U1 is a user wearing the HMD 200A, and the user U2 is a user wearing the HMD 200B.

As illustrated in FIG. 7, the processing control unit 350 sets a first straight line 533 connecting the viewpoint position 401 of the user U1 and the center of the object image 500, and sets a second straight line 535 connecting the viewpoint position 401 of the user U2 and the center of the object image 500. Further, the processing control unit 350 determines an intersection point of the first straight line 533 with the display surface 10 as a first display position 541, and determines an intersection point of the second straight line 535 with the display surface 10 as a second display position 543.

The processing control unit 350 sets a display position of the object image 500 within a range sandwiched between the set first straight line 533 and the set second straight line 535. For example, the processing control unit 350 sets a third straight line 545 connecting the first display position 541 and the second display position 543. Furthermore, the processing control unit 350 sets a fourth straight line 537. The fourth straight line 537 is set such that the fourth straight line 537 intersects the third straight line 545 between the first display position 541 and the second display position 543, and an angle θ formed with the first straight line 533 and an angle θ formed with the second straight line 535 are the same angle. The processing control unit 350 determines the display position such that the center of the object image 500 is located in an intersection position where the fourth straight line 537 intersects the display surface 10.

When the processing control unit 350 determines the display position of the object image 500, the processing control unit 350 outputs the content data 363 and positional information indicating the determined display position to the projector 100. The projector 100 causes the content data 363 input from the information processing device 300 to be superimposed on a display position of a background image indicated by setting information and to be displayed as the object image 500 on the display surface 10.

Figure 8:
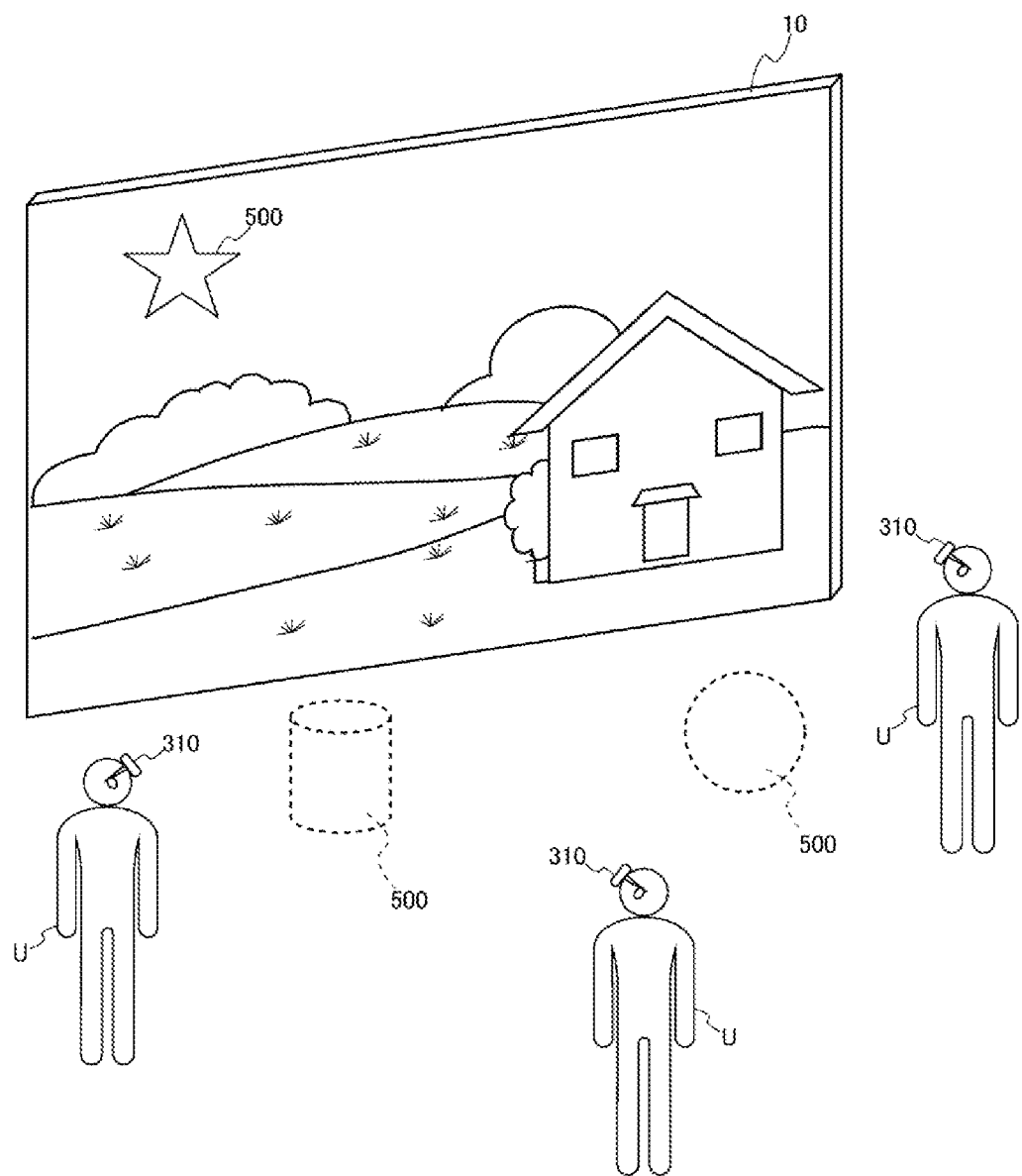
FIG. 8 is a diagram illustrating an example of an object image displayed by the display system.

In this way, as illustrated in FIG. 8, the object image 500 located at a distance shorter than the reference distance that is the distance from the user position to the display surface 10 is displayed in AR display or three-dimensional display by the HMD 200, and is thus recognized as a virtual object by the user U. Further, the object image 500 located at a distance longer than the reference distance is displayed as a two-dimensional image on the display surface 10 by the projector 100.

Although FIG. 8 illustrates a case in which only one display surface 10 is installed, a plurality of display surfaces 10 may be installed in the field. For example, two display surfaces 10 may be bonded together, and an image may be displayed on each of the two display surfaces 10 by two installed projectors 100. In this case, both sides of the bonded display surfaces 10 are fields, and a display position of the object image 500 is set on the both sides of the bonded display surfaces 10.

Figure 9:
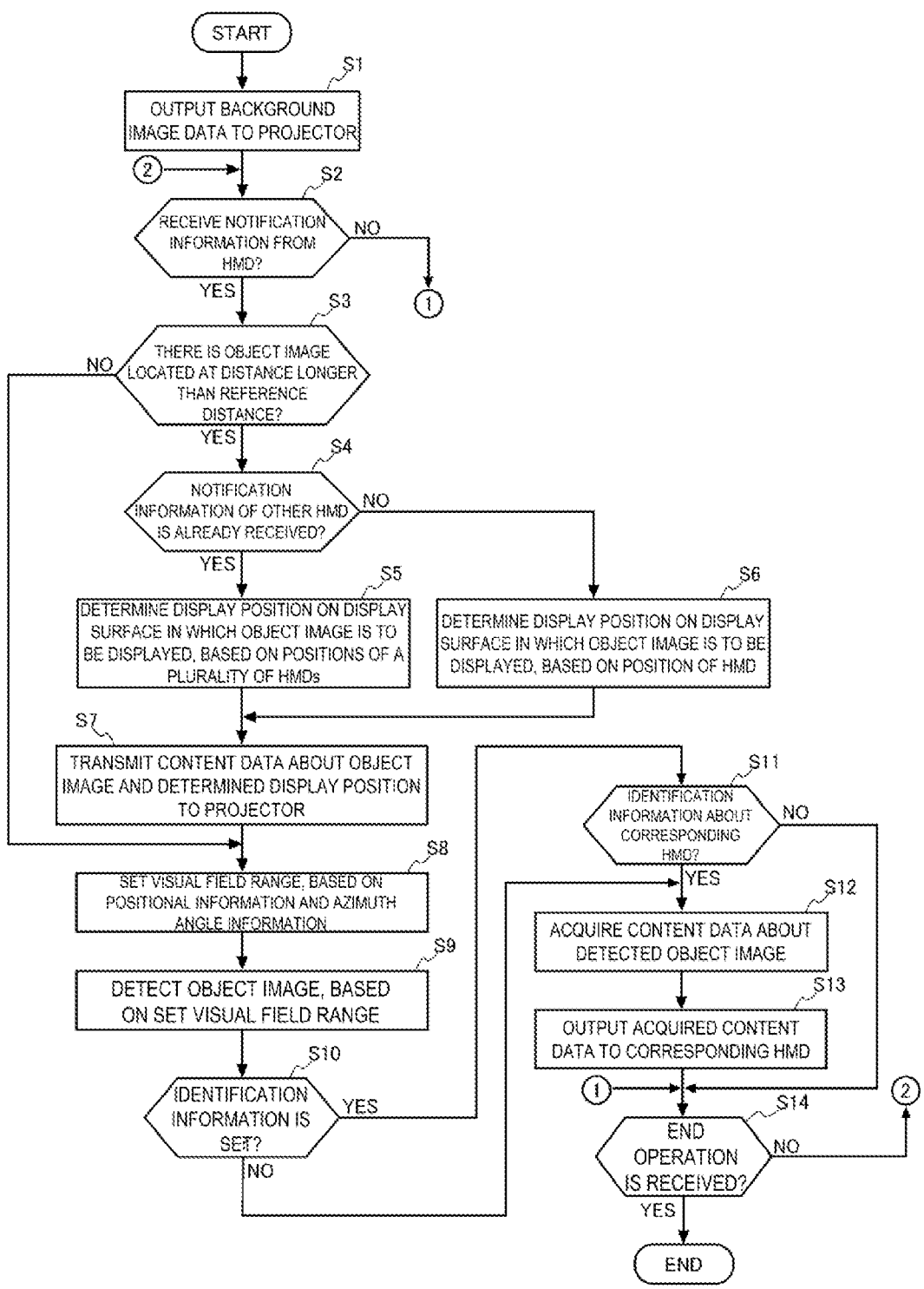
FIG. 9 is a flowchart illustrating an operation of the information processing device.

FIG. 9 is a flowchart illustrating an operation of the information processing device 300 that performs an image display method. The operation of the information processing device 300 will be described with reference to the flowchart illustrated in FIG. 9.

When the processing control unit 350 receives an operation preset by the input device 333, the processing control unit 350 first reads background image data from the processing device storage unit 360. The processing control unit 350 transmits the read background image data to the projector 100. When a plurality of pieces of background image data are stored in the processing device storage unit 360, the processing control unit 350 selects background image data selected by the input device 333 and background image data corresponding to a theme selected by the input device 333.

When the projector 100 receives the background image data from the information processing device 300, the projector 100 causes a background image that is an image based on the received background image data to be displayed on the display surface 10.

Next, the processing control unit 350 determines whether notification information including identification information, positional information, azimuth angle information, and elevation angle information or depression angle information is received from the HMD 200 (step S2). When the notification information is not received from the HMD 200 (step S2/NO), the processing control unit 350 proceeds to a determination in step S14. Step S2 corresponds to a reception step of the present disclosure.

When the notification information is received from the HMD 200 (step S2/YES), the processing control unit 350 determines the object image 500 to be displayed on the display surface 10 by the projector 100. First, the processing control unit 350 calculates a reference distance that is a distance from a position of the user U indicated by the received positional information to the display surface 10. For example, the processing control unit 350 calculates, as the reference distance, a distance from the position of the user U to the center of the display surface 10.

Next, the processing control unit 350 determines whether there is the object image 500 having a distance from the position of the user U to a corresponding position registered in the three-dimensional map data 361 longer than the calculated reference distance (step S3). When there is no object image 500 having a distance from the current position of the user U longer than the reference distance (step S3/NO), the processing control unit 350 proceeds to processing in step S8. Step S3 corresponds to a selection step of the present disclosure.

Further, when there is the object image 500 having a distance from the position of the user U to the corresponding position longer than the reference position, the processing control unit 350 determines whether notification information is received from the other HMD 200 (step S4). In other words, the processing control unit 350 determines whether there is another user U who uses the display system 1. When the notification information is not received from the other HMD 200 (step S4/NO), the processing control unit 350 determines a display position on the display surface 10 in which the object image 500 is displayed, based on the positional information included in the notification information received in step S2 (step S6).

Further, when the notification information is received from the other HMD 200 (step S4/YES), the processing control unit 350 determines a display position on the display surface 10 in which the object image 500 is displayed, based on the positional information of the plurality of users U (step S5). The processing control unit 350 transmits the determined display position and the content data 363 about the object image 500 to the projector 100 (step S7). Step S7 corresponds to a transmission step of the present disclosure.

Next, the processing control unit 350 selects the object image 500 to be displayed on the image display unit 210 of the HMD 200 that has received the notification information. First, the processing control unit 350 sets the visual field range 405 of the user U (step S8). The processing control unit 350 sets the visual field range 405 visually recognizable by the user U, based on the positional information, the azimuth angle information, and the elevation angle information or the depression angle information included in the received notification information. When the processing control unit 350 sets the visual field range 405, the processing control unit 350 detects the object image 500 having the corresponding position included within a range acquired by connecting the viewpoint position 401 and four vertexes of the visual field range 405 (step S9).

Next, the processing control unit 350 determines whether the identification information is set for the detected object image 500 (step S10). When the identification information is set for the detected object image 500 (step S10/YES), the processing control unit 350 determines whether the identification information of the HMD 200 is associated with the identification information of the object image 500 (step S11).

When the identification information of the HMD 200 is not associated with the identification information of the object image 500 (step S11/NO), the processing control unit 350 proceeds to the determination in step S14. Further, when the identification information of the HMD 200 is associated with the identification information of the object image 500 (step S11/YES), the processing control unit 350 acquires the content data 363 about the detected object image 500 from the processing device storage unit 360 (step S12). The processing control unit 350 transmits the acquired content data 363 to the corresponding HMD 200 (step S13).

Further, in step S10, when the identification information is not set for the detected object image 500 (step S10/NO), the processing control unit 350 acquires the content data 363 about the detected object image 500 from the processing device storage unit 360 (step S12). The processing control unit 350 transmits the acquired content data 363 to the corresponding HMD 200 (step S13).

Next, the processing control unit 350 determines whether an end operation is received (step S14). When the end operation is not received (step S14/NO), the processing control unit 350 proceeds to the determination in step S2. Further, when the end operation is received (step S14/YES), the processing control unit 350 causes the processing flow to end.

As described above, the display system 1 according to the present exemplary embodiment includes the projector 100 configured to cause the object image 500 to be displayed on the display surface 10, the HMD 200 mounted on the head of the user U and configured to display the object image 500 so as to be visually recognizable together with an external scene, and the information processing device 300 communicably coupled to the projector 100 and the HMD 200.

The information processing device 300 refers to the three-dimensional map data 361 in which a position in the real space associated with the object image 500 and a position of the display surface 10 in the real space are recorded, and acquires the position in the real space associated with the object image 500 and the position of the display surface 10 in the real space.

Further, the information processing device 300 causes the object image 500 to be displayed on any one of the projector 100 and the HMD 200, based on a position of the HMD 200 notified from the HMD 200, the acquired position in the real space associated with the object image 500, and the acquired position of the display surface 10 in the real space.

The information processing device 300 causes the object image 500 to be displayed on any one of the projector 100 and the HMD 200, based on a positional relationship between a position of the HMD 200 and a position in the real space associated with the object image 500.

For example, when the position of the HMD 200 and the position in the real space associated with the object image 500 are closer than the positions of the HMD 200 and the display surface 10, the object image 500 can be displayed on the HMD 200. Further, when the position of the HMD 200 and the position in the real space associated with the object image 500 are farther than the positions of the HMD 200 and the display surface 10, the object image 500 can be displayed on the display surface 10.

Therefore, a processing load on the HMD 200 can be reduced further than that when all the object image 500 is displayed on the HMD 200. Further, since a part of the object image 500 is displayed on the display surface 10, a processing load on the device of the HMD 200 can be reduced while suppressing a reduction in realism provided to the user U.

The HMD 200 includes the geomagnetic sensor 213, the six-axis sensor 215, the beacon reception unit 235, and the position detection unit 273 configured to detect a position of the HMD 200, based on data output from the geomagnetic sensor 213, the six-axis sensor 215, and the beacon reception unit 235. The HMD 200 transmits, as notification information, the position of the HMD 200 detected by the position detection unit 273 to the information processing device 300.

Further, the information processing device 300 includes the processing device control unit 350 and the processing device storage unit 360 configured to store the three-dimensional map data 361.

The processing device control unit 350 transmits the content data 363 about the object image 500 to the projector 100 when a distance between the position of the HMD 200 notified by the notification information and the position in the real space associated with the object image 500 is longer than the distance between the HMD 200 and the display surface 10.

The projector 100 causes the object image 500 based on the content data 363 received from the information processing device 300 to be displayed on the display surface 10.

For example, in a case in which the HMD 200 three-dimensionally displays the object image 500, when the position in the real space associated with the object image 500 is too far from the user U, the user U may not be able to recognize the object image 500 as a stereoscopic object. Thus, the projector 100 displays, on the display surface 10, the object image 500 that cannot be recognized as a stereoscopic object by the user U, and thus a processing load on the HMD 200 can be reduced while suppressing a reduction in realism.

The processing device control unit 350 transmits the content data 363 about the object image 500 to the HMD 200 when the distance between the position of the HMD 200 and the position in the real space associated with the object image 500 is shorter than the distance between the HMD 200 and the display surface 10.

The HMD 200 displays an image based on the content data 363 about the object image 500 received from the information processing device 300 such that an external scene is visually recognizable.

Therefore, the HMD 200 displays the object image 500 that can be three-dimensionally displayed by the HMD 200, and thus a reduction in realism provided to the user U can be suppressed.

The HMD 200 includes the head orientation detection unit 275 configured to detect an orientation of the head of the user U and an angle of the head with respect to the vertical direction. The HMD 200 transmits, as the notification information, the orientation and the angle of the head detected by the head orientation detection unit 275 to the information processing device 300.

The processing device control unit 350 estimates the visual field range 405 of the user U, based on the orientation and the angle of the head notified by the notification information, and detects, as a candidate, the object image 500 being visually recognizable in the estimated visual field range 405 and associated with the position in the real space. Further, the processing device control unit 350 selects whether to display the object image 500 detected as the candidate on the projector 100 or to display the object image 500 on the HMD 200.

Therefore, the object image 500 visually recognizable by the user U of the HMD 200 can be selected as the candidate and displayed by the HMD 200 or the projector 100.

The HMD 200 includes the HMD storage unit 260 configured to store identification information identifying the HMD 200. The HMD 200 transmits, as the notification information, the position of the HMD 200 detected by the position detection unit 273 and the identification information of the HMD 200 to the information processing device 300.

The processing device storage unit 360 stores the identification information registration table 365 in which identification information identifying the object image 500 and the identification information identifying the HMD 200 are registered in association with each other. The processing device control unit 350 transmits the content data 363 about the object image 500 to the HMD 200 when the distance between the position of the HMD 200 and the position in the real space associated with the object image 500 is shorter than the distance between the HMD 200 and the display surface 10, and the identification information of the object image 500 is associated with the identification information of the HMD 200.

Therefore, the object image 500 can be displayed only on the HMD 200 associated with the identification information of the object image 500.

The processing device control unit 350 determines a position of the display surface 10 on which the object image 500 is displayed, based on the position of the HMD 200 and the position in the real space associated with the object image 500, when the distance between the position of the HMD 200 and the position in the real space associated with the object image 500 is longer than the distance between the HMD 200 and the display surface 10.

Further, the processing control unit 350 transmits positional information indicating the determined position of the display surface 10 together with the content data 363 about the object image 500 to the projector 100.

Therefore, the position of the display surface 10 on which the object image 500 is displayed can be determined based on the position of the HMD 200 and the position in the real space associated with the object image 500.

The processing device control unit 350 determines the position of the display surface 10 on which the object image 500 is displayed such that the position of the HMD 200, the position in the real space associated with the object image 500, and the position of the display surface 10 on which the object image 500 is displayed are aligned on a straight line.

Therefore, the object image 500 can be displayed in the position of the display surface 10 corresponding to the direction of the position in the real space associated with the object image 500.

The display system 1 includes the HMD 200A and the HMD 200B as the HMD 200. The processing device control unit 350 determines a position of the display surface 10 on which the object image 500 is displayed, based on a position of the HMD 200A, a position of the HMD 200B, and the position in the real space associated with the object image 500, when a distance between the position of the HMD 200A and the position in the real space associated with the object image 500 is longer than a distance between the HMD 200A and the display surface 10, and a distance between the position of the HMD 200B and the position in the real space associated with the object image 500 is longer than a distance between the HMD 200B and the display surface 10.

The processing device control unit 350 transmits positional information indicating the determined position of the display surface 10 together with the content data 363 about the object image 500 to the projector 100.

Therefore, the position of the display surface 10 on which the object image 500 is displayed can be determined based on the position of the HMD 200A, the position of the HMD 200B, and the position in the real space associated with the object image 500.

The processing device control unit 350 selects the first display position 541 of the object image 500 on the display surface 10 so that the first display position 541 is located on a straight line connecting the position of the HMD 200A and the position in the real space associated with the object image 500. Further, the processing device control unit 350 selects the second display position 543 of the object image 500 on the display surface 10 so that the second display position 543 is located on a straight line connecting the position of the HMD 200B and the position in the real space associated with the object image 500.

The processing device control unit 350 determines a position of the display surface 10 on which the object image 500 is displayed between the first display position 541 and the second display position 543, and transmits positional information indicating the determined position of the display surface 10 together with the content data 363 about the object image 500 to the projector 100.

Therefore, the position of the display surface 10 on which the object image 500 is displayed can be set so as to reduce a difference between when viewed in the direction of the position in the real space associated with the object image 500 from a position of the user U of the HMD 200A and when viewed in the direction of the position in the real space associated with the object image 500 from a position of the user U of the HMD 200B.

The HMD 200 includes the operation unit 231, or the camera 211 and the detection control unit 281 as a reception unit configured to receive an operation of the user U.

The HMD 200 transmits, when the reception unit receives an operation of changing the position in the real space associated with the object image 500 and an operation of specifying a moving amount and a moving direction of the position in the real space, information indicating the received moving amount and the received moving direction to the information processing device 300.

The processing device control unit 350 changes the position in the real space associated with the object image 500, based on the information indicating the moving amount and the moving direction received from the HMD 200.

Therefore, the position in the real space associated with the object image 500 can be changed by an operation of the user U of the HMD 200.

Next, an application example of the display system 1 will be described with specific examples.

For example, when the user U conducts work for operating equipment, the display system 1 can be used for the purpose of supporting work by a supporter providing information related to the operation of the equipment from a remote place, such as describing and guiding the operation of the equipment. Specifically, the display system 1 is applicable to a case in which a setup and an operation of an application program are performed with a personal computer as a work target object. Further, for example, the display system 1 is applicable to a case in which an operation and maintenance of a machine are performed with the machine such as a machine tool, an industrial machine, and various household electronic apparatuses as a work target object. In other words, when the user U who performs maintenance of various machines visits an installation place of the machine as a work target in response to a request by a user, and performs maintenance, the display system 1 can be used for an application in supporting the user U with a low skill level by a supporter.

In this example, a machine such as a machine tool, an industrial machine, and various household electronic apparatuses, a personal computer, and the like as a work target object of a work target can be installed on a work stand. Further, a position where the equipment, the personal computer, and the like are installed can also be regarded as a work stand. In this case, the user U wearing the HMD 200 can perform hands-free work at the installation place of the machine such as a machine tool, an industrial machine, and various household electronic apparatuses, the personal computer, and the like as a work target.

In such a case, the user U at a supported site at a remote place and a supporter at a supporting site such as a service center can share information, and the supporter at the supporting site can provide an instruction and change display by displaying an AR image on the HMD 200. Then, support can be provided by the HMD 200 showing, as a virtual image, an operation by a hand and fingers of the supporter at the supporting site. In this case, it is also effective to give description while the supporter at the support site places the same equipment as a work target object at the supported site in front and actually operates the equipment. The supporter can provide an instruction and teach by performing a position instruction operation on a specific portion of an actual object at a site, and can efficiently provide support with a simple operation.

Further, the information processing device 300 may display a process table indicating an overall process of work and an enlarged image of an AR image displayed on the HMD 200.

The present disclosure is not limited to the configurations described in the exemplary embodiments described above, and the present disclosure can be implemented in various aspects without departing from the gist of the disclosure.

For example, a current position of the HMD 200 may be detected based on a captured image of the camera 211. In this case, the HMD storage unit 260 previously stores map data in which an arrangement of objects present in the field is described. The HMD control unit 250 may detect an object captured in a captured image of the camera 211, and detect a current position of the HMD 200, based on a distance from the detected object.

Further, a movement and a position of the head of the user U may be detected by a position tracking sensor. For example, an infrared ray sensor is installed in a fixed position in the field. By detecting an infrared ray emitter or an infrared ray reflection marker provided on a surface of the HMD 200 by using the infrared ray sensor, an orientation of the head of the user U wearing the HMD 200 and a position of the HMD 200 may be detected.

Figure 3:
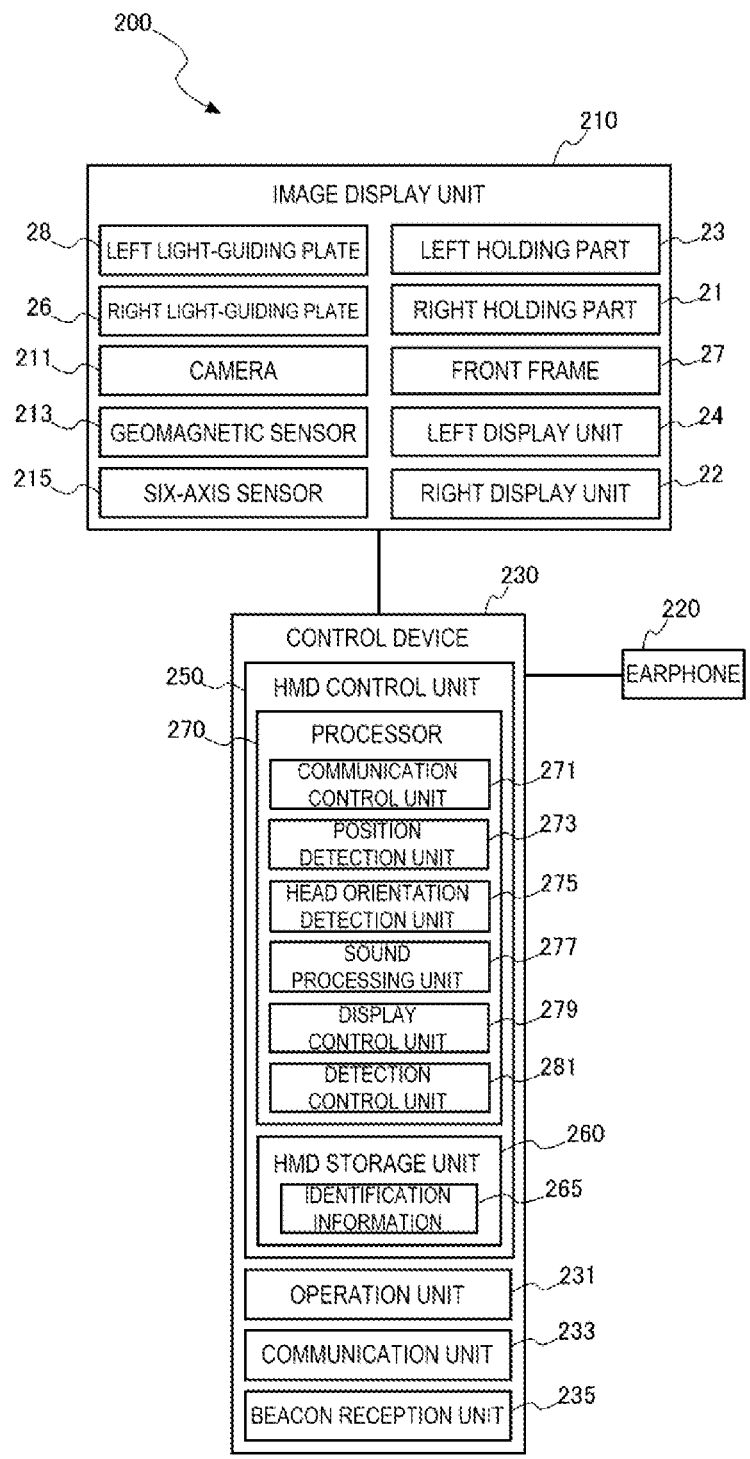
FIG. 3 is a block configuration diagram illustrating a configuration of an HMD.

At least some of the functional blocks illustrated in FIGS. 2 to 4 may be achieved in the form of hardware or may be achieved by a cooperation of hardware and software, and, is not limited to a configuration in which independent hardware resources are arranged as illustrated in the drawings. Further, the program executed by the processor 370 of the information processing device 300 may be configured to acquire and execute a program stored in an external device via the first communication unit 310 or the second communication unit 320.

What is claimed is:

1. A display system, comprising:
   a display device configured to display an object image on a display surface; and
   a head-mounted display apparatus mounted on a head of a user and configured to display an object image so as to be visually recognizable together with an external scene, wherein
   the display system refers to map data in which a position in a real space associated with the object image and a position of the display surface in the real space are recorded, and acquires the position in the real space associated with the object image and the position of the display surface in the real space, and
   the display system displays the object image on any one of the display device and the head-mounted display apparatus, based on a position of the head-mounted display apparatus notified from the head-mounted display apparatus, the acquired position in the real space associated with the object image, and the acquired position of the display surface in the real space, wherein
   the display system includes an information processing device communicably coupled to the display device and the head-mounted display apparatus,
   the head-mounted display apparatus includes a position detection unit configured to detect a position of the head-mounted display apparatus, and transmits, as notification information, the position of the head-mounted display apparatus detected by the position detection unit to the information processing device,
   the information processing device includes
   a first storage unit configured to store the map data, and
   a control unit configured to transmit image data of the object image to the display device when a distance between the position of the head-mounted display apparatus notified by the notification information and the position in the real space associated with the object image is longer than a distance between the head-mounted display apparatus and the display surface, and
   the display device displays, on the display surface, the object image based on the image data received from the information processing device.

2. The display system according to claim 1, wherein the control unit transmits the image data of the object image to the head-mounted display apparatus when the distance between the position of the head-mounted display apparatus and the position in the real space associated with the object image is shorter than the distance between the head-mounted display apparatus and the display surface, and
   the head-mounted display apparatus displays an image based on the image data of the object image received from the information processing device such that the external scene is visually recognizable.

3. The display system according to claim 1, wherein the head-mounted display apparatus includes a head orientation detection unit configured to detect an orientation of the head of the user and an angle of the head with respect to a vertical direction, and transmits, as the notification information, the orientation and the angle of the head detected by the head orientation detection unit to the information processing device, and
   the control unit estimates a visual field range of the user, based on the orientation and the angle of the head notified by the notification information, detects, as a candidate, the object image being visually recognizable in the estimated visual field range and associated with the position in the real space, and selects whether to display the object image detected as the candidate on the display device or to display the object image on the head-mounted display apparatus.

4. The display system according to claim 1, wherein the head-mounted display apparatus
   includes a second storage unit configured to store identification information identifying the head-mounted display apparatus, and
   transmits, as the notification information, the position of the head-mounted display apparatus detected by the position detection unit and the identification information of the head-mounted display apparatus to the information processing device,
   the first storage unit stores identification information identifying the object image and the identification information identifying the head-mounted display apparatus in association with each other, and
   the control unit transmits the image data of the object image to the head-mounted display apparatus when the distance between the position of the head-mounted display apparatus and the position in the real space associated with the object image is shorter than the distance between the head-mounted display apparatus and the display surface, and the identification information of the object image is associated with the identification information of the head-mounted display apparatus.

5. The display system according to claim 1, wherein the control unit
   determines a position of the display surface on which the object image is displayed, based on the position of the head-mounted display apparatus and the position in the real space associated with the object image, when the distance between the position of the head-mounted display apparatus and the position in the real space associated with the object image is longer than the distance between the head-mounted display apparatus and the display surface, and
   transmits positional information indicating the determined position of the display surface together with the image data of the object image to the display device.

6. The display system according to claim 5, wherein the control unit determines the position of the display surface on which the object image is displayed such that the position of the head-mounted display apparatus, the position in the real space associated with the object image, and the position of the display surface on which the object image is displayed are aligned on a straight line.

7. The display system according to claim 1, wherein
the head-mounted display apparatus includes a first head-mounted display apparatus and a second head-mounted display apparatus,
the control unit
determines a position of the display surface on which the object image is displayed, based on a position of the first head-mounted display apparatus, a position of the second head-mounted display apparatus, and the position in the real space associated with the object image, when a distance between the position of the first head-mounted display apparatus and the position in the real space associated with the object image is longer than a distance between the first head-mounted display apparatus and the display surface, and a distance between the position of the second head-mounted display apparatus and the position in the real space associated with the object image is longer than a distance between the second head-mounted display apparatus and the display surface, and
transmits positional information indicating the determined position of the display surface together with the image data of the object image to the display device.

8. The display system according to claim 7, wherein
the control unit
selects a first display position of the object image on the display surface so that the first display position is located on a straight line connecting the position of the first head-mounted display apparatus and the position in the real space associated with the object image,
selects a second display position of the object image on the display surface so that the second display position is located on a straight line connecting the position of the second head-mounted display apparatus and the position in the real space associated with the object image,
determines a position of the display surface on which the object image is displayed between the first display position and the second display position, and
transmits positional information indicating the determined position of the display surface together with the image data of the object image to the display device.

9. The display system according to claim 1, wherein
the head-mounted display apparatus includes a reception unit configured to receive an operation of the user, and transmits, when the reception unit receives an operation of changing the position in the real space associated with the object image and an operation of specifying a moving amount and a moving direction of the position in the real space, information indicating the moving amount and the moving direction received to the information processing device, and
the control unit changes the position in the real space associated with the object image, based on the information indicating the moving amount and the moving direction received from the head-mounted display apparatus.

10. An information processing device communicably coupled to a display device configured to display an object image on a display surface, and a head-mounted display apparatus mounted on a head of a user and configured to display an object image so as to be visually recognizable together with an external scene, the information processing device comprising:
a first storage unit configured to store map data in which a position in a real space associated with the object image and a position of the display surface in the real space are recorded; and
a control unit configured to display the object image on any one of the display device and the head-mounted display apparatus, based on a position of the head-mounted display apparatus notified from the head-mounted display apparatus, the position in the real space associated with the object image, and the position of the display surface in the real space, wherein
the head-mounted display apparatus includes a position detection unit configured to detect the position of the head-mounted display apparatus, and transmits, as notification information, the position of the head-mounted display apparatus detected by the position detection unit to the information processing device, and
the control unit is further configured to transmit image data of the object image to the display device when a distance between the position of the head-mounted display apparatus notified by the notification information and the position in the real space associated with the object image is longer than a distance between the head-mounted display apparatus and the display surface.

11. A display control method of a display system including a display device configured to display an object image on a display surface, and a head-mounted display apparatus mounted on a head of a user and configured to display an object image so as to be visually recognizable together with an external scene, the display control method of a display system comprising:
receiving, from the head-mounted display apparatus, notification information that notifies a position of the head-mounted display apparatus;
referring to map data in which a position in a real space associated with the object image and a position of the display surface in the real space are recorded, and acquiring the position in the real space associated with the object image and the position of the display surface in the real space; and
displaying the object image on any one of the display device and the head-mounted display apparatus, based on the position of the head-mounted display apparatus, the acquired position in the real space associated with the object image, and the acquired position of the display surface in the real space,
wherein image data of the object image is transmitted to the display device when a distance between the position of the head-mounted display apparatus notified by the notification information and the position in the real space associated with the object image is longer than a distance between the head-mounted display apparatus and the display surface.

* * * * *